(12) United States Patent
Goldstein et al.

(10) Patent No.: US 12,375,451 B2
(45) Date of Patent: Jul. 29, 2025

(54) SYSTEM AND METHOD FOR EFFICIENT ALLOCATION OF RANGE AS A SERVICE IN A CLOUD COMPUTING ENVIRONMENT

(71) Applicant: Cympire Ltd., Raanana (IL)

(72) Inventors: Eran Goldstein, Tel Aviv (IL); Yaniv Shachar, Tel Aviv (IL)

(73) Assignee: Cympire Ltd., Raanana (IL)

( * ) Notice: Subject to any disclaimer, the term of this patent is extended or adjusted under 35 U.S.C. 154(b) by 439 days.

(21) Appl. No.: 17/819,153

(22) Filed: Aug. 11, 2022

(65) Prior Publication Data

US 2024/0056423 A1 Feb. 15, 2024

(51) Int. Cl.
*G06F 21/00* (2013.01)
*H04L 9/40* (2022.01)

(52) U.S. Cl.
CPC ........ *H04L 63/0272* (2013.01); *H04L 63/102* (2013.01)

(58) Field of Classification Search
CPC ............................ H04L 63/0272; H04L 63/102
See application file for complete search history.

(56) References Cited

U.S. PATENT DOCUMENTS

| | | | |
|---|---|---|---|
| 10,958,670 B2 | 3/2021 | Haletky et al. | |
| 11,056,017 B2 | 7/2021 | Lee et al. | |
| 11,216,265 B1* | 1/2022 | Hornbeck | G06F 9/5072 |
| 11,265,343 B2 | 3/2022 | Basu et al. | |
| 2019/0342397 A1* | 11/2019 | Laibson | H04L 9/0894 |
| 2020/0366650 A1* | 11/2020 | Morton | H04L 63/0272 |
| 2023/0062582 A1* | 3/2023 | Avadhanam | G06F 12/1458 |

* cited by examiner

*Primary Examiner* — Kendall Dolly
(74) *Attorney, Agent, or Firm* — M&B IP Analysts, LLC

(57) ABSTRACT

A system and method generate a virtual range in a cloud computing infrastructure. The system is configured to receive a graphical user interface (GUI) input, the GUI input including a visual representation of an isolated virtual space, a visual representation of a subnet, and a visual representation of a cloud entity, each visual representation including a placement within the GUI; generate, based on the received GUI input an instruction set for an infrastructure as a service (IaaS) application programming interface (API) of a cloud computing infrastructure, the instruction set when executed configuring the cloud computing environment to initiate the isolated virtual space, the subnet, and the cloud entity; and electronically transmit the generated instruction set to the IaaS API of the cloud computing environment, wherein transmitting the generated instruction set to the IaaS API configures the IaaS API to execute the instruction set.

19 Claims, 6 Drawing Sheets

SYSTEM AND METHOD FOR EFFICIENT ALLOCATION OF RANGE AS A SERVICE IN A CLOUD COMPUTING ENVIRONMENT

TECHNICAL FIELD

The present disclosure relates generally to cybersecurity, and specifically to providing a virtual environment in which responses to cybersecurity threat scenarios can be practiced.

BACKGROUND

Cybersecurity is a field of technology which aims to protect, and prevent, computer systems from unwanted information disclosure, theft, damage, misdirection, disruption, and the like. However, despite the various technological solutions, one of the greatest flaws in computer systems is the human operator. Social engineering, misconfigurations, delays in updating systems known to contain security threats, all lead to cybersecurity issues which are a result of human error.

In tandem, while many threats can be stopped and mitigated automatically, it is often advantageous to have a human operator intervene in order to understand a broader context which a machine may not. For example, cybersecurity forensics is a field of endeavor where a human operator attempts to uncover what an attacker managed to accomplish in a computing environment, and provide context for various actions in the cloud computing environment which are not always apparent to a machine.

As in any field, a human operator is only as good as the training they receive. It is therefore beneficial to provide training facilities and resources to human operators, in order, for example, to measure their ability to respond to cybersecurity threats, to measure their ability to uncover and detect cybersecurity events, and to train them in order to improve their skill.

For this purpose, certain providers supply a cyber range, or range as a service, which provide a virtual environment in which cybersecurity threats are purposefully added to train human operators on how to respond to such threats. The virtual environments attempt to provide a realistic experience, and provide environments in which solutions can be tested without real-world repercussions.

Often, a cyber range is provided as a virtual environment deployed on a cloud service. While the environment is simulated, the threats are real, and so such environments must be contained and well defined. Any misconfiguration can potentially cause harm which ripples through the cloud environment, and possible to other cloud environments as well. On the other hand, such constraints make defining a range more difficult for a human operator, and more security constraints means less flexibility in how a range is deployed, and the amount of time it takes to deploy a range. It is useful to increase flexibility in order to train with different scenarios, and it is useful to decrease the amount of time it takes to deploy a range as this increases engagement with the range platform, which makes it more likely to be used by trainees.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for generating a virtual range in a cloud computing infrastructure. The method comprises: receiving a graphical user interface (GUI) input, the GUI input including a visual representation of an isolated virtual space, a visual representation of a subnet, and a visual representation of a cloud entity, each visual representation including a placement within the GUI; generating, based on the received GUI input an instruction set for an infrastructure as a service (IaaS) application programming interface (API) of a cloud computing infrastructure, the instruction set when executed configuring the cloud computing environment to initiate the isolated virtual space, the subnet, and the cloud entity; and electronically transmitting the generated instruction set to the IaaS API of the cloud computing environment, wherein transmitting the generated instruction set to the IaaS API configures the IaaS API to execute the instruction set.

Certain embodiments disclosed herein also include a non-transitory computer readable medium having stored thereon causing a processing circuitry to execute a process, the process comprising: receiving a graphical user interface (GUI) input, the GUI input including a visual representation of an isolated virtual space, a visual representation of a subnet, and a visual representation of a cloud entity, each visual representation including a placement within the GUI; generating, based on the received GUI input an instruction set for an infrastructure as a service (IaaS) application programming interface (API) of a cloud computing infrastructure, the instruction set when executed configuring the cloud computing environment to initiate the isolated virtual space, the subnet, and the cloud entity; and electronically transmitting the generated instruction set to the IaaS API of the cloud computing environment, wherein transmitting the generated instruction set to the IaaS API configures the IaaS API to execute the instruction set.

Certain embodiments disclosed herein also include a system for generating a virtual range in a cloud computing infrastructure. The system comprises: a processing circuitry; and a memory, the memory containing instructions that, when executed by the processing circuitry, configure the system to: receive a graphical user interface (GUI) input, the GUI input including a visual representation of an isolated virtual space, a visual representation of a subnet, and a visual representation of a cloud entity, each visual representation including a placement within the GUI; generate, based on the received GUI input an instruction set for an infrastructure as a service (IaaS) application programming interface (API) of a cloud computing infrastructure, the instruction set when executed configuring the cloud computing environment to initiate the isolated virtual space, the subnet, and the cloud entity; and electronically transmit the generated instruction set to the IaaS API of the cloud computing environment, wherein transmitting the generated instruction set to the IaaS API configures the IaaS API to execute the instruction set.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
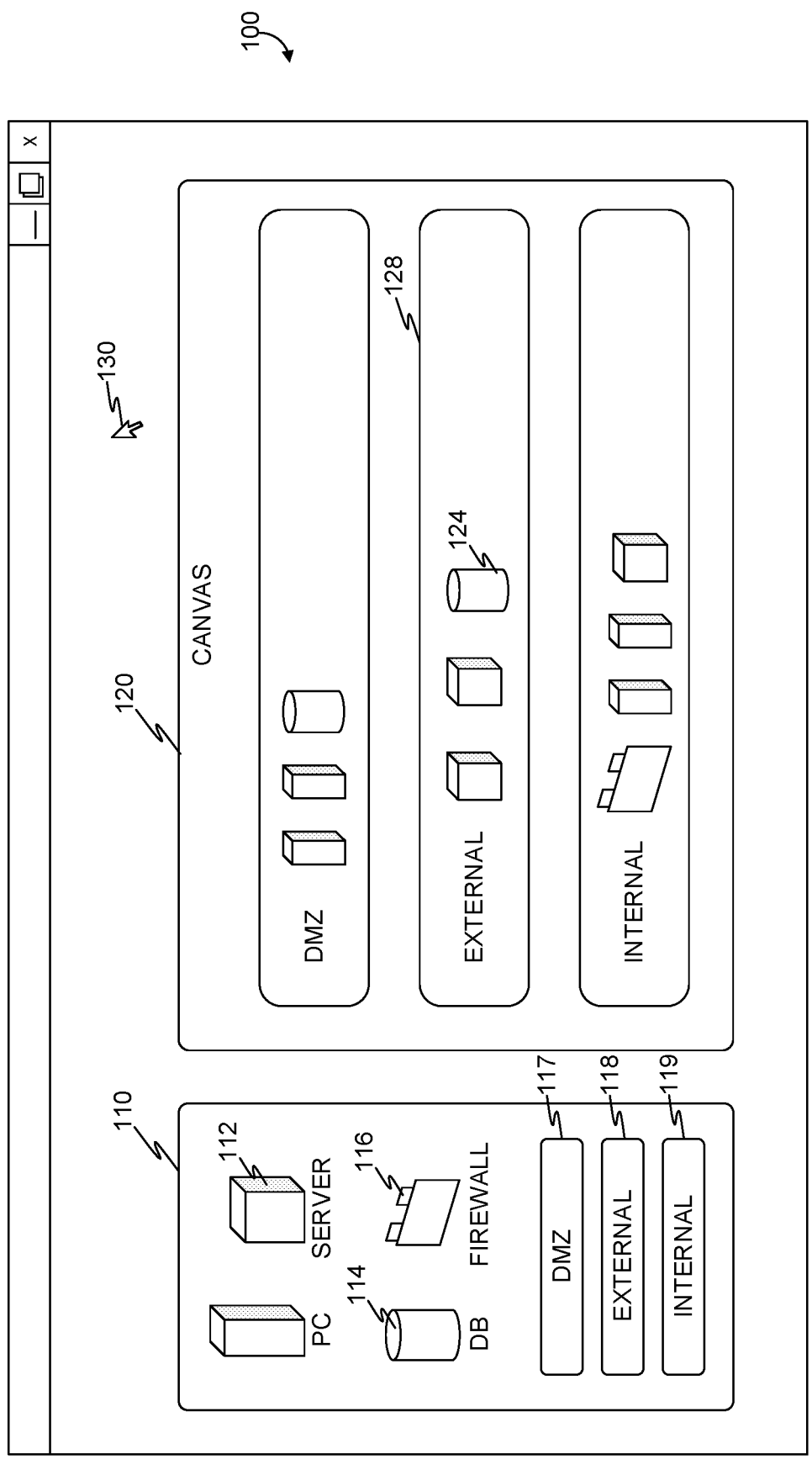
FIG. 1 is an illustration of a graphical user interface for generating a cybersecurity virtual environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for generating a virtual range in a cloud computing infrastructure. A virtual range is an isolated virtual space, such as a virtual private cloud (VPC), Virtual network (VNet), and the like, deployed in a cloud computing infrastructure. A cloud computing infrastructure is, for example, Amazon® Web Services (AWS), Google® Cloud Platform (GCP), Microsoft® Azure, and the like. The virtual range includes a predefined subnet and a cloud entity deployed therein. A cloud entity may be, for example, a principal, a resource, and the like. For example, the virtual instance is a resource. In an embodiment, a principal is any one of: a user account, a service account, a role, and the like.

The system includes a graphical user interface (GUI) through which a user can provide an input. In an embodiment the input includes visual representations of various elements (i.e., isolated virtual space, subnet, cloud entity, etc.) and placements thereof. The system generates deployment instructions based on the GUI input, and the deployment instructions, when executed in a cloud computing environment, for example by an orchestrator, cause the cloud computing environment to deploy an isolated virtual space having a subnet and a cloud entity.

It is recognized that generating instructions to deploy a range is an activity that can be performed by human operators. When performed in this manner, a human operator typically writes computer code using a markup language, such as YAML, which is supplied, for example as a file, to a cloud computing infrastructure, and based on which actions are initiated in the cloud computing infrastructure which cause deployment of a range defined by the YAML file.

When initiating a virtual machine utilizing YAML, for example, the virtual machine needs to be explicitly associated with a subnet, which in turn needs to be explicitly associated with a VPC. Each such requirement for an explicit definition is a potential failure point, where a user may incorrectly define an explicit requirement. Therefore, receiving instructions for deploying a range by receiving a YAML file as an input is not an effective way of deploying a range, in addition to it being an error prone way.

The disclosed system overcomes at least this, by providing a graphical user interface, where a user can drag visual representations into a blank canvas, and by placing certain visual representations inside of other visual representations, indicate implicitly, rather than define explicitly, how a relationship is defined between cloud entities. For example, a visual representation of a subnet placed inside a visual representation of a VPC indicates that the VPC is associated with the subnet. Likewise, a visual representation of a virtual machine inside a subnet which is inside a VPC indicates that the virtual machine should be deployed with an address selected from the subnet in the VPC. Rather than providing explicit definitions at each stage, by simply placing visual representations in different places on a canvas of the GUI, the system is configured to determine the explicit relationships and generate appropriate instructions which when executed cause deployment of a range based on the provided GUI input.

FIG. 1 is an example illustration of a graphical user interface for generating a cybersecurity virtual environment, implemented in accordance with an embodiment. A graphical user interface 100 (GUI 100) includes a stencil 110 and a canvas 120. In an embodiment, the stencil 110 includes graphical representations, such as icons, which each represent a network entity. In certain embodiments, a network entity is a computer, such as server 112, a service such as database 114, firewall 116, and the like, a user, a role, a user group, and the like.

A network entity, when deployed in a network environment such as a cloud computing environment, may be a cloud entity. A cloud entity may be, for example, a resource, a principal, and the like. A principal is a cloud entity which acts on a resource, and in an embodiment is configured to initiate actions in the cloud computing environment. A user account, service account, and a role are examples of a principal.

A resource is a cloud entity which provides a service, or access to a compute resource, such as a processor, a memory, a storage, combinations thereof, and the like. In an embodiment, a resource is any one of a virtual machine, a container, a serverless function, and the like. In certain embodiments a resource is an application, such as a web application firewall, a virtual appliance, a database management system (DBMS), a load balancer, a proxy server, and the like. In some embodiments, a cloud entity may be both a principal and a resource. For example, a load balancer is a principal with respect to a web server on which it acts and initiates actions, a resource with respect to a user account which acts on the load balancer, for example, to access the web server.

In an embodiment, the stencil 110 further contains representations of subnetworks, such as DMZ 117, external network 118, and internal network 119. In an embodiment, each representation displayed in the stencil 110 is associated with instructions which when executed configure a computer system, such as detailed below, to generate a virtual instance, environment, and the like, which corresponds to the representation, or to a customized version of the representation, according to an embodiment.

In an embodiment, the GUI 100 is configured to interact with a user by receiving input from a cursor, such as pointer 130. For example, an input may be detecting the cursor on, or in proximity of, a representation, such as server 112. In an embodiment the GUI 100 is configured to receive an input indicating, for example, a 'click' or a 'drag and drop', such that the cursor clicks on the external network 118 of the stencil 110, drags the representation of the external network 118 to the canvas 120 to generate an external network representation 128 in the canvas 120. Network entities may be dragged and dropped into the external network representation 128, for example, by dragging database 114 to the external network representation 128 and generating a database 124 therein by dropping the representation 114 into the external network representation 128.

In an embodiment, a network entity may be preconfigured. For example, the server 112 may be preconfigured as a virtual machine having a Microsoft® Windows® operating system (OS) running an Apache® HTTP Server. In certain embodiments, once a network entity is dragged into a canvas, the network entity may be further configured, for example by changing metadata associated with the network entity. For example, the database 124 may be customized by changing metadata associated with visual representation. Metadata may be, for example, a database type, database management system (DBMS) version, and the like. In an embodiment a database type is a SQL database, a NoSQL database, and the like. For example, an SQL database may be a relational database such as MySQL. A NoSQL database may be, for example, MongoDB, Neo4j, and the like. In an embodiment, the GUI 100 is configured to receive an input, such as a double-click from an input device when the cursor 130 is positioned over or near the visual representation of the database 124. In an embodiment, the input, when received, configures the GUI 100 to display metadata associated with the database 124. A user may provide additional input to the GUI 100 to change the metadata.

In an embodiment, the canvas 120 is a visual representation of a range environment which a user wishes to deploy, for example in a cloud computing environment. Dragging and dropping are a form of providing input which human operators find intuitive, thus allowing to a human operator to define a representation of a network environment in the canvas 120.

In an embodiment, a range server (not shown) is configured to receive input from the GUI 100, for example from the canvas 120, and generate a range based on the received input. An example of a range server is discussed in more detail with respect to FIG. 3 below.

Figure 2:
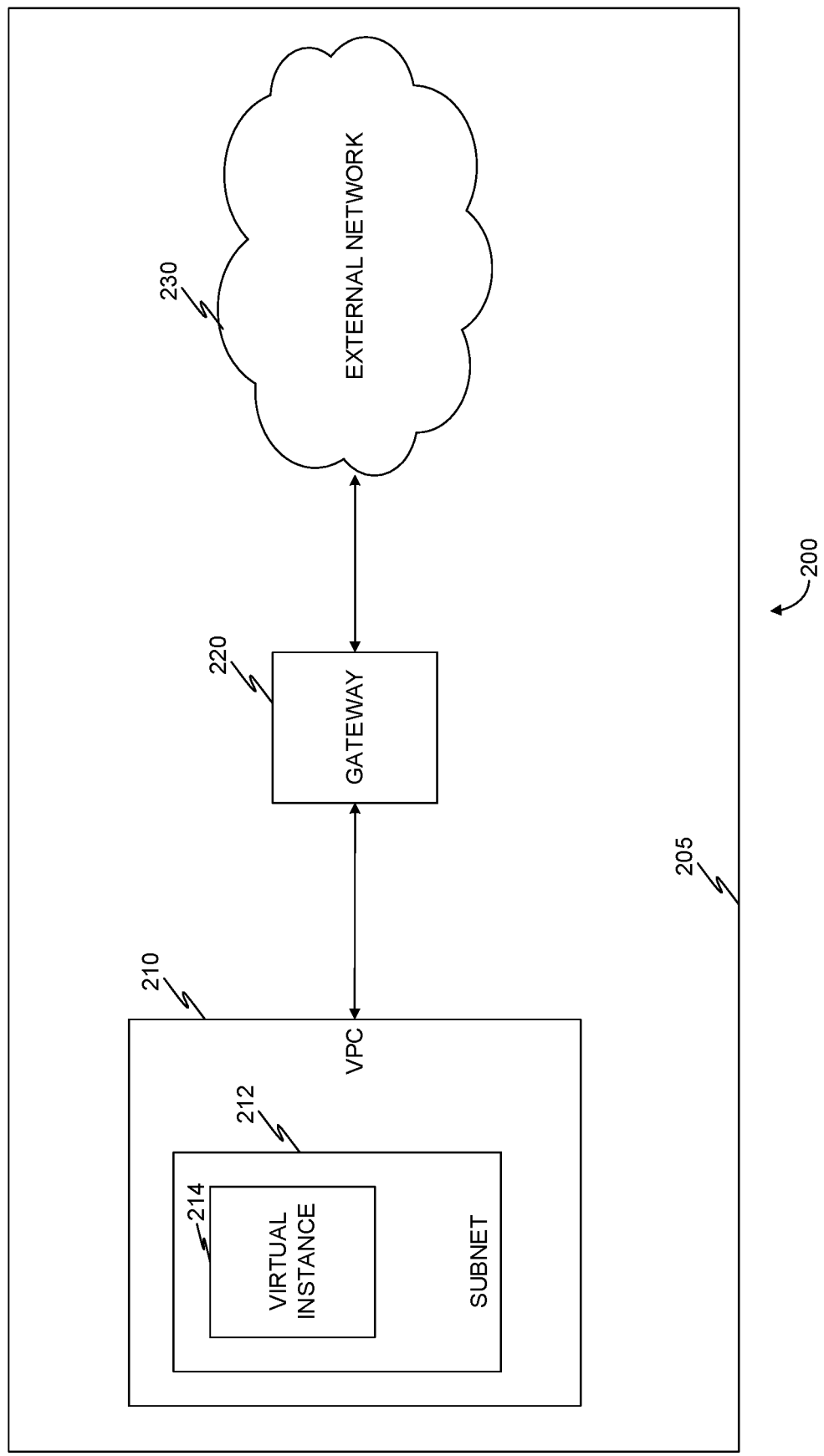
FIG. 2 is a schematic illustration of a range environment, implemented according to an embodiment.

FIG. 2 is an example schematic illustration of a range environment, implemented according to an embodiment. A range environment 200 (also referred to as a virtual range 200) includes a plurality of visual representations, each of which is placed in location within a predefined area 205. A location of a visual representation is used to determine, in an embodiment, an association of a network element which is generated as a result of the visual representation.

For example, a virtual private cloud (VPC) is represented as VPC 210 in the predefined area 205. In an embodiment, the predefined area 205 is the canvas 120 of FIG. 1 above. In certain embodiments, each representation includes, for example, as metadata, coordinates, relative coordinates, and the like, which indicate where the representation is relative to, for example, the predefined area 205. In an embodiment, a VPC is an isolated section of a cloud computing infrastructure, such as provided by Amazon® Web Services (AWS). In certain embodiments, the VPC 210 includes metadata which indicates parameters which should be utilized to generate the VPC in a cloud computing infrastructure. Metadata for a VPC 120 may be, for example, a range of network addresses, such as IP addresses.

A subnet 212 is represented in the VPC 210 representation. By placing the subnet 212 in the VPC 210, a user is indicating that a subnet represented by the subnet 212 should be generated in a VPC represented by the VPC 210. A VPC 120 may include a plurality of subnets, in an embodiment. Each subnet is allocated a portion of the network addresses of the VPC 210. In an embodiment, the allocated portion of the network addresses may be stored as metadata associated with the representation of the subnet 212.

A virtual instance 214 is placed in the subnet 212. By placing a virtual instance 214 in the subnet 212 a user is indicating that a virtual instance represented by the virtual instance 214 should be generated with a network address which is selected from the allocated portion of the network addresses of the subnet 212. In an embodiment, a virtual instance 214 includes associated metadata. The metadata may indicate, for example, what type of virtual instance should be generated. For example, a virtual instance may be a virtual machine, a serverless function, a container, and the like.

In an embodiment, the VPC 210 is connected to a gateway 220. In an embodiment, the gateway 220 is a representation of a virtualization of a gateway in a cloud computing environment, and routes communication between the VPC 210 and other network regions. Network regions may be, for example, another VPC (which is not the VPC 210), an external network 230, and the like.

In an embodiment, a user may indicate that a VPC 210 is connected to a gateway 220 for example by generating an arrow, or other connector, connecting the VPC 210 to the gateway 220. In some embodiments, the connector, the gateway 220, or both, may be associated with routing rules which specify how to route network traffic to and from the VPC 210.

Generating such visual representations of a virtual range is a task which is intuitive for a user to perform, as it aligns with other similar tasks a human performs. By providing a user with a GUI through which they can provide inputs for generating a virtual range, such ranges can be generated faster and more efficiently, as is detailed throughout this disclosure.

Figure 3:
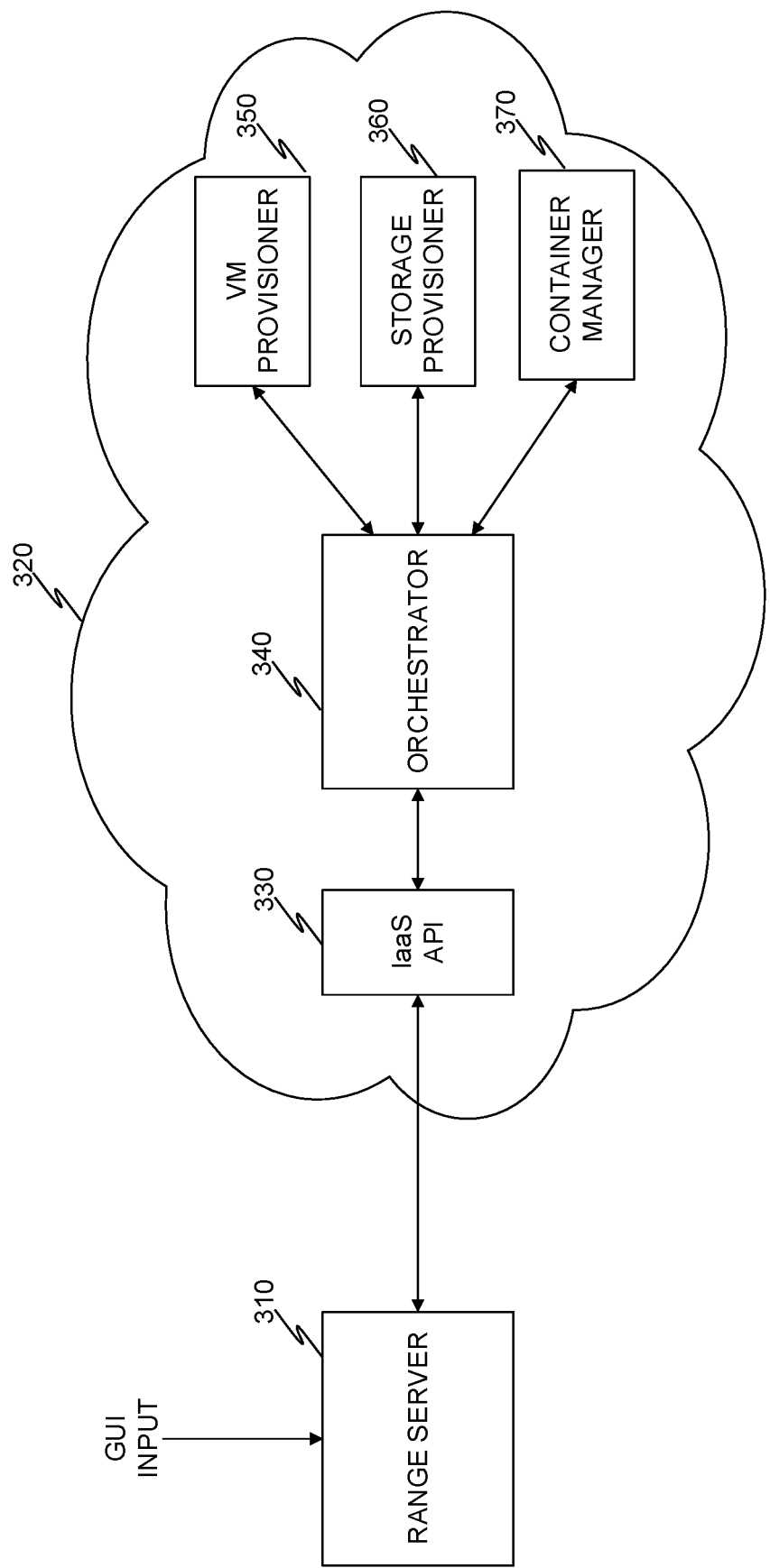
FIG. 3 is a schematic diagram for generating of a virtual range by a range server, implemented in accordance with an embodiment.

FIG. 3 is an example of a schematic diagram for generating of a virtual range by a range server, implemented in accordance with an embodiment. In an embodiment, a range server 310 is configured to receive input from a GUI, such as GUI 100 of FIG. 1 above. In certain embodiments, a range server 310 is implemented as a virtual machine, a software container, a serverless function, and the like. In an embodiment, the range server 310 further includes a rule engine which is configured to receive an input and generate an instruction output, the instruction when executed by an orchestrator of a cloud computing environment, causes initiation an action in the cloud computing environment.

For example, the range server 310 is configured to receive an input from a GUI utilized to generate a schematic illustration of a virtual range. In an embodiment, the input includes a data structure, including a representation of a plurality of network elements, each network element associated with metadata and a relative location. In an embodiment, the relative location and metadata are provided to the rule engine of the range server 310 to determine what instruction to generate for generating a corresponding virtual instance in a cloud computing environment.

For example, in an embodiment, a rule engine is configured to detect that a virtual instance is represented in a representation of the subnet. The rule engine is configured to output an instruction which when executed configures a virtual instance to have an address corresponding to the subnet. In an embodiment, the range server 310 is configured to generate instructions for an application programming interface (API) of an Infrastructure as a Service (IaaS) 330 of a cloud computing infrastructure 320. For example, cloud computing infrastructure 320 may be provided by Amazon® Web Services (AWS), Google® Cloud Platform (GCP), Microsoft® Azure, and the like.

In an embodiment, where the cloud computing infrastructure 320 is provided by AWS, the range server 310 is configured to generate the instructions using Boto3, which is a software development kit (SDK) for AWS infrastructure services. Generating instructions through the IaaS API 330, when executed by an orchestrator 340 of the cloud computing infrastructure 320, configure the cloud computing infrastructure 320 to initiate an action therein. By configuring the cloud computing infrastructure 320 to initiate actions through the IaaS API 330, the actions are initiated without a markup language file, which would otherwise be required in order to initiate the actions. For example, a virtual machine can be initiated through the IaaS API 330, or by providing a YAML file. YAML files are typically provided by a user, for example, by manually typing code of the markup language. This is prone to errors, misconfigurations, and is a time consuming process. Therefore, by initiating the virtual machine through the IaaS API 330 in place of providing a YAML file, human error is reduced, allowing to deploy a virtual range in a more expedient manner.

In an embodiment, an orchestrator 340 is a implemented as a virtual machine, a software container, a serverless function, a combination thereof, and the like, in order to initiate certain actions in the cloud computing infrastructure 320. For example, an action may be to initialize a virtual machine, initialize a serverless function, deploy a node in a container cluster, deploy a container cluster, provision infrastructure, provision a platform, provision an application, a combination thereof, and the like. For example, in an AWS environment, UiPath™ provides orchestration services.

In certain embodiments, the orchestrator 340 is configured to initiate actions utilizing a service in the cloud computing infrastructure 320. For example, a service may be a virtual machine provisioner 350, such as provided by Amazon® Elastic Compute Cloud (EC2). In some embodiments a service is a storage provisioner 360, such as Amazon Simple Storage Service (S3). In yet other embodiments a service is a container manager 370, such as Amazon® Elastic Kubernetes™ Service (EKS), which utilizes a Kubernetes orchestration system to provision and manage software containers.

Figure 4:
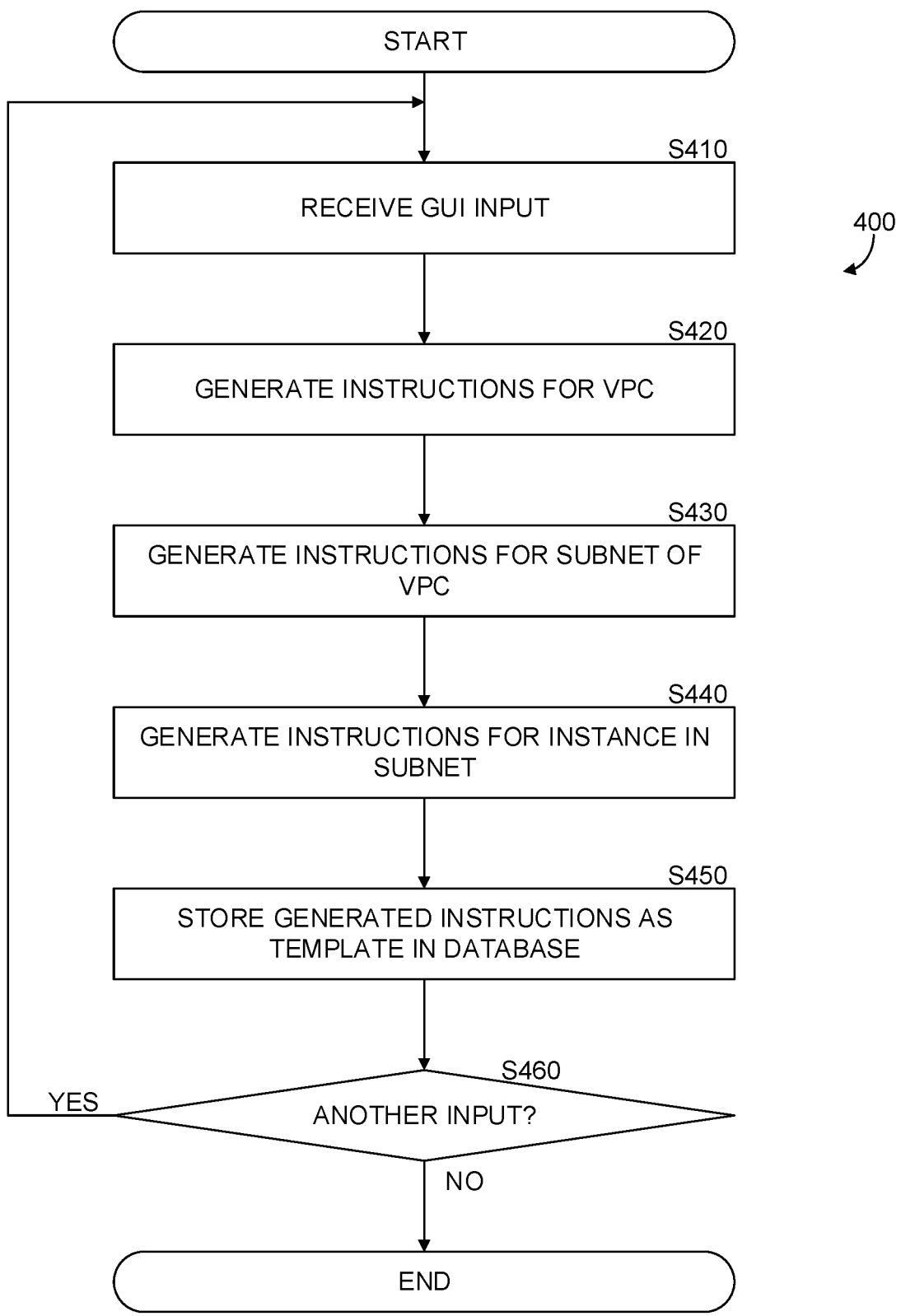
FIG. 4 is a flowchart of a method for generating an instruction set for initiating a virtual range in a cloud computing environment utilizing an infrastructure as a service API, implemented in accordance with an embodiment.

FIG. 4 is an example flowchart 400 of a method for generating an instruction set for initiating a virtual range in a cloud computing environment utilizing an infrastructure as a service API, implemented in accordance with an embodiment.

At S410, a graphical user interface (GUI) input is received. In an embodiment, the GUI input includes a plurality of visual representation, each visual representation corresponding to a network element. In an embodiment, a network element is any one of: a resource, a principal, a virtual machine, a container, a serverless function, an application, a virtual appliance, a subnet, a user account, a service account, a role, a combination thereof, and the like.

In certain embodiments, a network element is associated with metadata. Metadata includes, in an embodiment, any one of: resource type, user type, user group, and the like. In some embodiments, the network element is further associated with a cybersecurity risk. A cybersecurity risk may be, for example, a misconfiguration, a vulnerability, an exposure, a weak password, an out of date software, an out of data operating system, and the like. For example, a network element may be a virtual machine having a version of Log 4j with a Log 4Shell security flaw.

In an embodiment, the network element is further associated with a placement, a size, and a combination thereof. In some embodiments, the placement, size, and the like, are relative to another visual representation, to a background on which visual representations are displayed, and the like. In certain embodiments, a placement is implemented as coordinates, relative coordinates, and the like. For example, a placement may be defined by (x,y) coordinates, where each 'x' and each 'y' correspond to a pixel, or group of pixels, on a grid of a display. In an embodiment, the placement may further include a second set of coordinate (x+n,y+m), which together with the coordinates define an area.

In some embodiments, associating a network element with metadata, a security flaw, a placement, a size, and the like, includes generating a data structure, for example according to a predefined data schema.

At S420, instructions for initiating an isolated virtual space are generated. In an embodiment, the isolated virtual space is a virtual private cloud (VPC), for example in Amazon® Web Services (AWS) or Google® Cloud Platform (GCP), a virtual network (VNet) in Microsoft® Azure, and the like. In an embodiment, the instructions are generated in a language compatible with an infrastructure as a service (IaaS) API of a cloud computing infrastructure on which the virtual range is intended for deployment. In an embodiment, the instructions include an instruction which when executed by a cloud computing infrastructure configure the VPC to include a range of network addresses. A network address may be, for example, an IP address.

At S430, instructions for initiating a subnet are generated. In an embodiment, the generated instructions, when executed configure the subnet to be initiated in the isolated virtual space. In an embodiment, the subnet includes a portion of network addresses allocated to the isolated virtual space. For example, a subnet includes a portion of IP addresses allocated to a VPC. In some embodiments, instructions are generated which when executed by a cloud computing infrastructure configure the generated isolated virtual space to include a plurality of subnets, each subnet including a portion of the allocated network addresses, such that there is no overlap between an allocation of network addresses of a first subnet and an allocation of network addresses of a second subnet.

In some embodiments, the subnet is associated with the isolated virtual space based on the received GUI input. For example, a visual representation of the subnet may be determined to be placed inside of a virtual representation of the isolated virtual space. In an embodiment, determining that the subnet is placed inside of the of the isolated virtual space includes detecting that coordinates associated with the subnet overlap with coordinates associated with the isolated virtual space. For example, a VPC is associated with coordinates (10,10) and (100,100), which together define a rectangular area. A subnet which is associated with coordinates (20,20) and (30,30) is therefore within the rectangular area of the VPC.

In an embodiment, where a second visual representation is determined to be within a first visual representation, instructions for initiating a network element corresponding to the second visual representation are further configured to associate the network element with another network element, which is represented by the first visual representation.

In an embodiment, the instructions are generated in a language compatible with an infrastructure as a service (IaaS) API of a cloud computing infrastructure on which the subnet is intended for deployment.

At S440, instructions for initiating a virtual instance are generated. A virtual instance is, in an embodiment, a virtual machine, a container, a serverless function, and the like. In certain embodiments, the instructions are generated based on the received GUI input. For example, a visual representation of the virtual instance is placed inside a visual representation of a subnet. As explained in more detail above, a visual representation of a subnet can be associated with an area of display, for example by use of a pair of coordinates for a rectangular area. A visual representation (e.g., an icon) of the virtual instance can be dragged, for example from a stencil, and placed inside a representation of a virtual instance. In an embodiment, the instruction for initiating the virtual instance is further generated based on a placement associated with the visual representation of the virtual instance. For example, a visual representation of a virtual machine is placed inside a visual representation of a subnet, which in turn is placed inside a visual representation of a VPC. In an embodiment detecting placement of the visual representation of the virtual machine can be performed as detailed above with respected to detecting placement of the subnet. In some embodiments, instructions for initiating a cloud entity are generated. A cloud entity may be a principal, a resource, and the like. For example, the virtual instance is a resource. In an embodiment, a principal is any one of: a user account, a service account, a role, and the like.

In certain embodiments, the instructions for initiating the virtual machine are configured based on the detected placement, for example, by initiating the virtual machine to have a network address from the portion of network addresses allocated to the subnet, which in turn is allocated to the portion of network addresses from the VPC. By performing this detection and generating initiation instructions based thereof, explicit associations are not required. For example, when initiating a virtual machine utilizing YAML, the virtual machine needs to be explicitly associated with a subnet, which in turn needs to be explicitly associated with a VPC. Each such requirement for an explicit definition is a potential failure point, where a user may incorrectly define an explicit requirement.

Therefore, it is advantageous to provide a visual based tool which does not require explicit definitions. In an embodiment, the instructions are generated in a language compatible with an infrastructure as a service (IaaS) API of a cloud computing infrastructure on which the virtual instance is intended for deployment.

At optional S450, the generated instructions are stored as a template. In an embodiment, the template may be stored as a transaction in a database. In some embodiments, a visual representation may be generated for the template. The template visual representation may be associated, for example, with a stencil. This is advantageous as it allows a user to define, for example, a larger building block of a virtual range. For example, a template may include a subnet with 4 virtual machines therein, each with a different cybersecurity vulnerability. By storing the template and providing the template as a visual representation, virtual range generation is speeded up as users can more quickly define the virtual range. In certain embodiments, the generated instructions are executed. Execution of generated instructions is discussed in more detail with respect to FIG. 5 below.

In some embodiments, a template may be generated based on generated instructions and a markup language file. For example, a YAML file is converted into a Boto3 instruction set, and the Boto3 instruction set is stored as part of the generated template. This is advantageous as it allows migration of existing ranges, or portions of ranges, from a markup language structure to an IaaS based instruction set.

At S460, a check is performed to determine if another input should be accepted. If 'yes' execution continues at S410. In some embodiments, if 'no' execution may pause, and perform another check within a predefined amount of time. In certain embodiments, the another check is performed a predefined amount of times before terminating execution. In other embodiments, if the check response does not return 'yes', or returns 'no', execution terminates.

Figure 5:
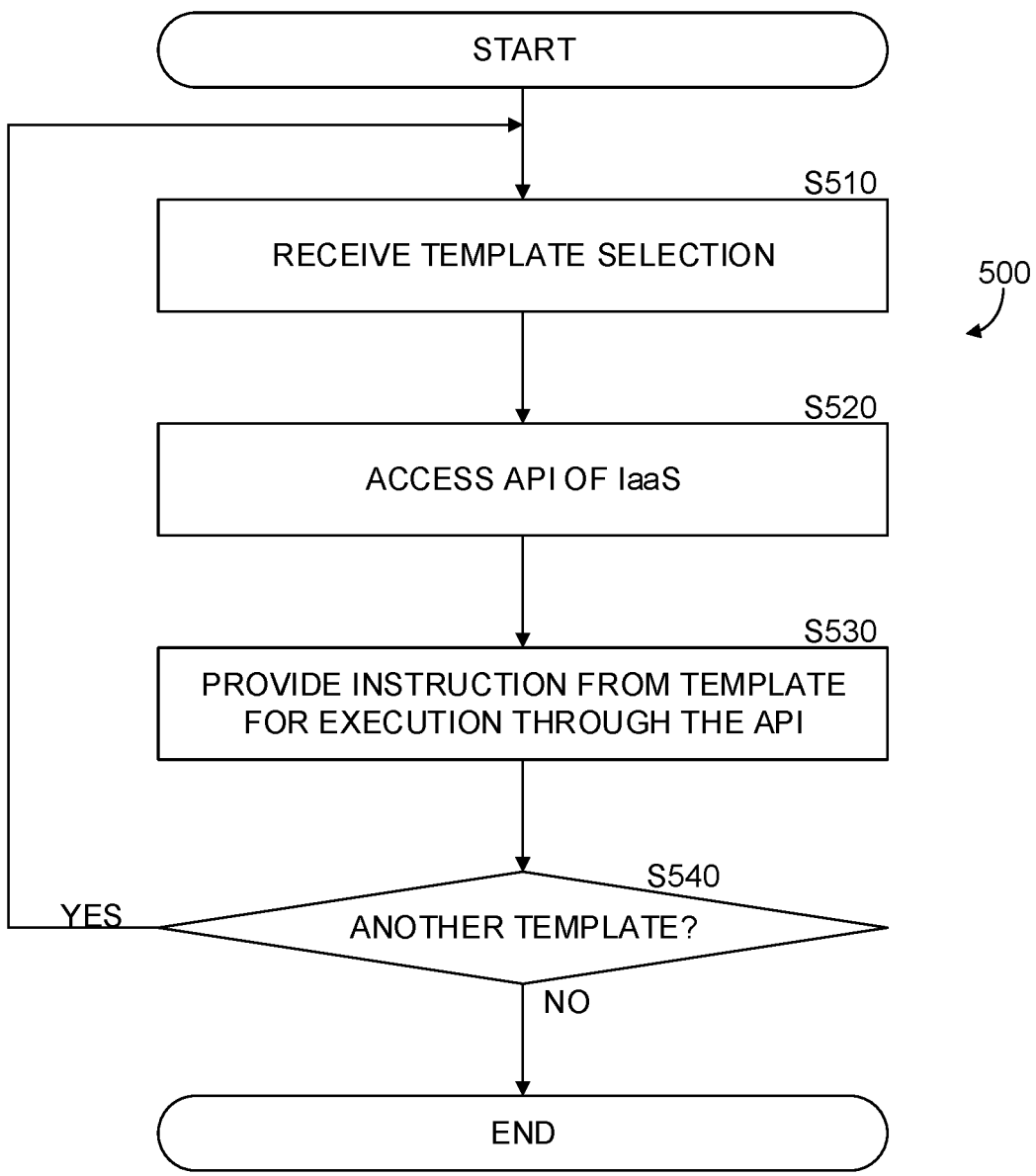
FIG. 5 is a flowchart of a method for initiating a virtual range based on generated instructions for an IaaS API, implemented in accordance with an embodiment.

FIG. 5 is an example of a flowchart 500 of a method for initiating a virtual range based on generated instructions for an IaaS API, implemented in accordance with an embodiment.

At S510, a template selection is received. In an embodiment, a template includes a group of instructions, which when executed by a cloud computing infrastructure, configure the cloud computing infrastructure to deploy a virtual range. A cloud computing infrastructure may be, for example, AWS, GCP, Azure, and the like. In certain embodiments, the template includes any one of: an instruction for generating an isolated virtual space, an instruction for generating a subnet, an instruction for generating a virtual instance, a combination thereof, and the like.

In an embodiment, a plurality of templates is selected. In some embodiments, a primary template is selected, which includes therein a plurality of secondary templates. In an embodiment, instructions of the template are generated in a language compatible with an infrastructure as a service (IaaS) API of a cloud computing infrastructure on which the virtual instance is intended for deployment. For example, for AWS the IaaS API is Boto3.

At S520, an IaaS API of a cloud computing infrastructure is accessed. In an embodiment, accessing an IaaS API of a cloud computing infrastructure includes providing a valid credential to the cloud computing infrastructure. A valid credential is a credential, such as a user name, a password, a passphrase, a key, a combination thereof, and the like, which is verified, for example by an identity and access management (IAM) service of the cloud computing infrastructure. In certain embodiments, accessing the IaaS API of the cloud computing infrastructure further includes specifying a region of the cloud computing infrastructure which the credentials are being used for.

At S530, the template instructions are provided through the IaaS API. In an embodiment, providing the template instructions through the IaaS API includes sending a file including the template instructions to an orchestrator service through the IaaS API. In some embodiments, the template instructions are provided in multiple batches. This may be advantageous where the virtual range includes multiple components which are not related for the purpose of deployment.

At S540, a check is performed to determine if another template should be processed. If 'yes' execution continues at S510. In some embodiments, if 'no' execution may pause, and perform another check within a predefined amount of time. In certain embodiments, another check is performed a predefined amount of times before terminating execution. In other embodiments, if the check response does not return 'yes', or returns 'no', execution terminates.

Figure 6:
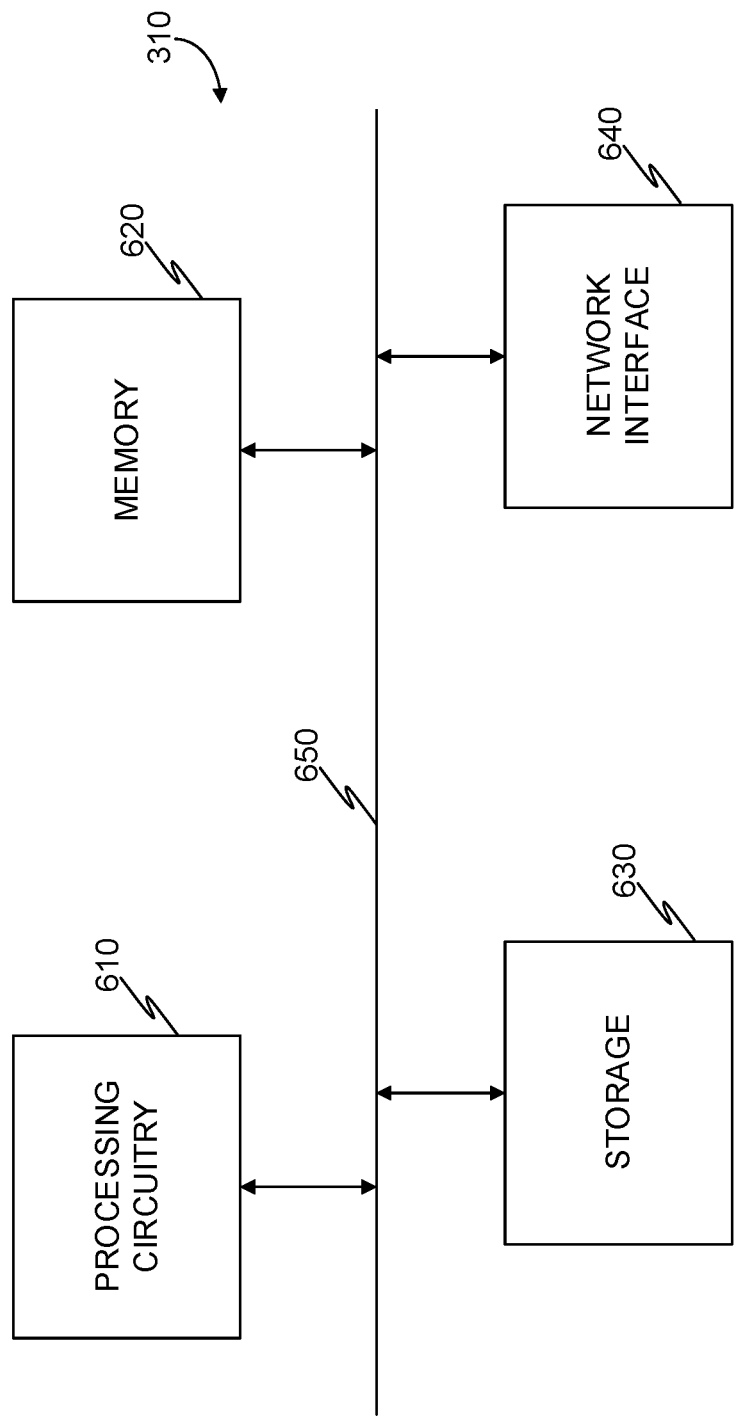
FIG. 6 is a schematic diagram of a ranger server according to an embodiment.

FIG. 6 is an example schematic diagram of a ranger server 310 according to an embodiment. The ranger server 310 includes a processing circuitry 610 coupled to a memory 620, a storage 630, and a network interface 640. In an embodiment, the components of the ranger server 310 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, or any other medium which can be used to store the desired information.

The network interface 640 allows the ranger server 310 to communicate with, for example, an IaaS API 330.

It should be understood that the embodiments described herein are not limited to the specific architecture illustrated in FIG. 6, and other architectures may be equally used without departing from the scope of the disclosed embodiments.

Furthermore, in certain embodiments a GUI generator for generating a GUI may be implemented with the architecture illustrated in FIG. 6. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a virtual range in a cloud computing infrastructure, comprising:
   receiving a graphical user interface (GUI) input, the GUI input including a visual representation of an isolated virtual space, a visual representation of a subnet, and a visual representation of a cloud entity, each visual representation including a placement within the GUI;
   generating, based on the received GUI input an instruction set for an infrastructure as a service (IaaS) application programming interface (API) of a cloud computing infrastructure, the instruction set when executed configuring the cloud computing environment to initiate the isolated virtual space, the subnet, and the cloud entity; and
   electronically transmitting the generated instruction set to the IaaS API of the cloud computing environment, wherein transmitting the generated instruction set to the IaaS API configures the IaaS API to execute the instruction set.

2. The method of claim 1, wherein the IaaS API executes the instruction set through an orchestrator of the cloud computing infrastructure.

3. The method of claim 1, wherein the isolated virtual space is any one of: a virtual private cloud (VPC), and a Virtual Network (VNet).

4. The method of claim 1, wherein the cloud entity is any one of: a virtual machine, a software container, a serverless function, a virtual appliance, a user account, a service account, a database, a gateway, and a load balancer.

5. The method of claim 1, further comprising:
generating the instruction set further based on the placement within the GUI.

6. The method of claim 5, wherein a placement of the visual representation of the subnet is within a placement of the isolated virtual space.

7. The method of claim 6, wherein a placement of the visual representation of the cloud entity is within the placement of the visual representation of the subnet.

8. The method of claim 7, further comprising:
generating an instruction to associate the subnet with the isolated virtual space, in response to detecting the placement of the visual representation of the subnet within the placement of the isolated virtual space.

9. The method of claim 7, further comprising:
generating an instruction to associate the cloud entity with the subnet, in response to detecting the placement of the visual representation of the cloud entity within the placement of the subnet.

10. A non-transitory computer readable medium having stored thereon instructions which when executed by a processing circuitry causes the processing circuitry to execute a process, the process comprising:
receiving a graphical user interface (GUI) input, the GUI input including a visual representation of an isolated virtual space, a visual representation of a subnet, and a visual representation of a cloud entity, each visual representation including a placement within the GUI;
generating, based on the received GUI input an instruction set for an infrastructure as a service (IaaS) application programming interface (API) of a cloud computing infrastructure, the instruction set when executed configuring the cloud computing environment to initiate the isolated virtual space, the subnet, and the cloud entity; and
electronically transmitting the generated instruction set to the IaaS API of the cloud computing environment, wherein transmitting the generated instruction set to the IaaS API configures the IaaS API to execute the instruction set.

11. A system for generating a virtual range in a cloud computing infrastructure, comprising:
a processing circuitry; and
a memory, the memory containing instructions that, when executed by the processing circuitry, configure the system to:
receive a graphical user interface (GUI) input, the GUI input including a visual representation of an isolated virtual space, a visual representation of a subnet, and a visual representation of a cloud entity, each visual representation including a placement within the GUI;
generate, based on the received GUI input an instruction set for an infrastructure as a service (IaaS) application programming interface (API) of a cloud computing infrastructure, the instruction set when executed configuring the cloud computing environment to initiate the isolated virtual space, the subnet, and the cloud entity; and
electronically transmit the generated instruction set to the IaaS API of the cloud computing environment, wherein transmitting the generated instruction set to the IaaS API configures the IaaS API to execute the instruction set.

12. The system of claim 11, wherein the IaaS API executes the instruction set through an orchestrator of the cloud computing infrastructure.

13. The system of claim 11, wherein the isolated virtual space is any one of: a virtual private cloud (VPC), and a Virtual Network (VNet).

14. The system of claim 11, wherein the cloud entity is any one of: a virtual machine, a software container, a serverless function, a virtual appliance, a user account, a service account, a database, a gateway, and a load balancer.

15. The system of claim 11, wherein the memory contains further instructions, that when executed by the processing circuitry further configure the system to:
generate the instruction set further based on the placement within the GUI.

16. The system of claim 15, wherein a placement of the visual representation of the subnet is within a placement of the isolated virtual space.

17. The system of claim 16, wherein a placement of the visual representation of the cloud entity is within the placement of the visual representation of the subnet.

18. The system of claim 17, wherein the memory contains further instructions, that when executed by the processing circuitry further configure the system to:
generate an instruction to associate the subnet with the isolated virtual space, in response to detecting the placement of the visual representation of the subnet within the placement of the isolated virtual space.

19. The system of claim 17, wherein the memory contains further instructions, that when executed by the processing circuitry further configure the system to:
generate an instruction to associate the cloud entity with the subnet, in response to detecting the placement of the visual representation of the cloud entity within the placement of the subnet.

* * * * *